United States Patent [19]

Panken

[11] Patent Number: 4,525,214

[45] Date of Patent: Jun. 25, 1985

[54] CRAYON ADAPTED FOR DEVELOPMENT OF LATENT IMAGES

[75] Inventor: Irving Panken, Dayton, Ohio

[73] Assignee: The Mazer Corporation, Dayton, Ohio

[21] Appl. No.: 474,289

[22] Filed: Mar. 11, 1983

[51] Int. Cl.³ .................. C09D 11/00; B41M 3/12; B41L 1/20

[52] U.S. Cl. .................. 106/19; 106/21; 106/26; 106/31; 106/27; 106/266; 106/193 R; 106/194; 427/150; 346/200

[58] Field of Search .......... 106/19, 194, 272, 21, 106/27-29, 264-266, 310; 260/144, 192; 427/150; 524/313

[56] References Cited

U.S. PATENT DOCUMENTS

| | | | |
|---|---|---|---|
| 2,215,143 | 2/1938 | Clayton | 524/313 |
| 2,618,866 | 11/1952 | Adams | |
| 2,835,604 | 5/1958 | Aronberg | 106/243 |
| 3,363,336 | 1/1968 | Skinner | 106/21 |
| 3,632,364 | 1/1972 | Thomas | 106/21 |
| 3,672,842 | 6/1972 | Florin | 436/164 |
| 3,769,045 | 10/1973 | Maierson | 106/21 |
| 3,843,384 | 10/1974 | Adachi et al. | 106/21 |
| 3,850,649 | 11/1974 | Buerkley | 106/21 |
| 3,957,495 | 5/1976 | Teranishi | 106/21 |
| 3,979,550 | 9/1976 | Panken | 428/488 |
| 4,098,738 | 4/1978 | Buerkley | 106/21 |
| 4,111,462 | 9/1978 | Lange | 101/469 |
| 4,111,702 | 9/1978 | Fraik | 106/19 |
| 4,186,243 | 1/1980 | Astbury | 428/537 |
| 4,188,431 | 12/1980 | Sokol | 428/24 |
| 4,205,865 | 6/1980 | Lange | 106/21 |
| 4,244,604 | 1/1981 | Fraser | 106/21 |
| 4,245,857 | 1/1981 | Satomura | 106/21 |
| 4,262,937 | 4/1981 | Fraser et al. | 106/21 |
| 4,304,183 | 12/1981 | Loria | 101/472 |
| 4,321,092 | 3/1982 | Cespon | 106/21 |
| 4,322,466 | 3/1982 | Tomlinson | 428/199 |
| 4,334,015 | 6/1982 | Yarian | 106/21 |
| 4,335,013 | 6/1982 | Allart | 106/21 |
| 4,336,067 | 6/1982 | Shackle | 106/21 |
| 4,339,275 | 7/1982 | Tutty | 524/255 |
| 4,343,652 | 8/1982 | Allart | 106/21 |
| 4,348,234 | 9/1982 | Cespon | 106/21 |
| 4,389,328 | 6/1983 | Bellettiere | 106/310 |

OTHER PUBLICATIONS

Blake, Chem., Abstract 63:9287(e).
Dugandzic, Chem., Abstract 74:60587(j).
Auterhoff et al., Chem., Abstract 79:78347(u).
Pasechnova et al., Chem., Abstract 84:53488(f).
Adachi, Chem., Abstract 85:13430(z).
Kubo, Chem., Abstract 83:50722(w).
Sierra, Chem., Abstract 53:8919(f).

Primary Examiner—Theodore Morris
Attorney, Agent, or Firm—Senniger, Powers, Leavitt and Roedel

[57] ABSTRACT

A latent image development system comprising a substrate having a latent image thereon and an instrument for dispensing a color developing agent over the image. The image contains a carboxylic or organic sulfonic acid salt of zinc, mercury, copper, iron, cobalt, aluminum or titanium and a binder for the salt. The dispensing instrument contains diiphenylcarbazone or a ring substituted diphenyl carbazone derivative.

Also disclosed are a crayon for use in developing a latent image, an ink for producing the latent image, a method for producing the crayon, and a system for use in printing and developing a latent image system.

14 Claims, 1 Drawing Figure

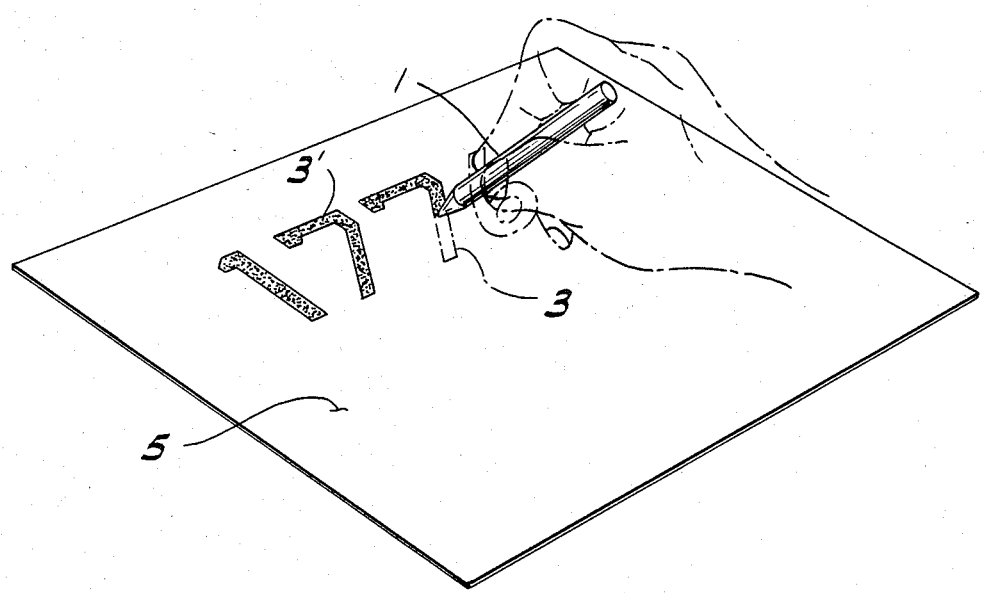

CRAYON ADAPTED FOR DEVELOPMENT OF LATENT IMAGES

BACKGROUND OF THE INVENTION

This invention relates to the field of latent image development systems and more particularly to a novel method for developing a colored image on a substrate by application of a color developing agent, comprising diphenylcarbazone or its derivatives, over a latent image containing a metal salt with which the color developing agent is reactive.

Latent image systems are used for a variety of purposes. In testing and instruction, the printing of correct test or workbook answers in a color developable latent image facilitates grading or self-instruction. Such color developable images also find application in various children's amusement devices such as coloring books, games and the like. A rather extensive art has developed in which various color development systems are used to render latent images visible.

Thus, for example, Fraik U.S. Pat. No. 4,111,702 describes a system in which a latent image containing dithiooxamide or a derivative thereof is developed by the use of a wax crayon which contains a coreactant metal salt and a trialkyl or triaryl phosphate as an image forming reaction accelerator. Salts of nickel, copper, cadmium and iron are disclosed as reactive with the dithiooxamide derivative to produce color.

Panken U.S. Pat. No. 3,979,550 describes pre-printed latent image spirit duplicating masters in which the latent image contains a color former such as dithiooxamide, N,N'bis(2-hydroxyethyl) dithiooxamide, N, N'didodecyl dithiooxamide, N,N'dimethyl dithiooxamide, or crystal violet. Development of the latent image is provided by use of a pen or crayon containing a nickel salt reactive with the latent image color former.

Buerkley et al. U.S. Pat. No. 4,850,649 describes a system in which a latent image containing a polyhydroxyaromatic complexing agent for iron, such as a derivative of gallic acid, pyrogallol or catechol, is developed using a wax crayon containing an iron salt.

Skinner U.S. Pat. No. 3,363,336 relates to a device for teaching writing skills, including a visible control image and a second image that is at least partially invisible and related in geometrical configuration to the control image. A wide variety of color development systems are disclosed including pH indicators, starch/iodine, clay/crystal violet lactone, lead acetate/xylenol orange, propyl gallate/iron salt, polyvinylpyrrolidone/dimethyl glyoxime/nickel chloride, and copper chloride/potassium succinate.

Lange et al. U.S. Pat. No. 4,111,462 and U.S. Pat. No. 4,205,865, Yarian U.S. Pat. No. 4,334,015, and Tomlinson U.S. Pat. No. 4,322,466 all relate to pressure releasable encapsulated color activating systems. The Lange patents disclose a latent image containing a transition metal salt of an aliphatic carboxylic acid which is complexed with dithiooxamide. Yarian utilizes an aryl substituted hydrazone corresponding to the formula

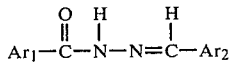

where $Ar_1$ and $Ar_2$ are independently selected aromatic substituents and the coreactant is a transition metal. Tomlinson teaches the chealating of $Fe^{+3}$ or $Cr^{+2}$ with EDTA, tannic acid, gallic acid, glyoximes or benzophenones. Other systems disclosed by Tomlinson use ink containing 2[bis(hydroxyphenyl)methyl] benzoic acid, 3,3-bis-[4-hydroxy2-methyl-5(1-methylethyl)]1 3H isobenzofurone or 4-nitrophenol, developed with an alkaline solution such as KOH or $K_2CO_3$.

Adachi et al. U.S. Pat. No. 3,843,384, Kubo Japanese Pat. No. 1974:33670, and Adachi et al. Japanese Pat. No. 1976:03647 disclose thermosensitive copying materials in which two components that are reactive to form a color product are dispersed in a binder. Upon contact with a heated pen or impingement of infrared radiation, the binder softens and allows contact between the components so that the color reaction occurs in the heated area. Among the components disclosed for use in carrying out the color reaction are various metal soaps as electron donors and diphenylcarbazone or another carbazone derivative as an electron acceptor.

SUMMARY OF THE INVENTION

Among the several objects of the present invention, may be noted the provision of novel latent image development system; the provision of such a system which is useful in tests, self-instructional materials and children's games; the provision of such a latent image system wherein the image is developed by use of a wax crayon; the provision of such a latent image development system in which the image may be printed on stock paper; the provision of such a latent image development system in which the image has good aging properties; the provision of such a system in which the image is resistant to humid atmospheres; the provision of systems for use in the preparation of such latent image development systems; the provision of a crayon for development of a latent image; and the provision of methods for the development of latent images.

Briefly, therefore, the present invention is directed to a latent image system comprising a substrate having a latent image thereon. The image is comprised of a carboxylic or organic sulfonic acid salt and a binder therefor. The salt is of a metal selected from the group consisting of zinc, mercury, copper, iron, cobalt, aluminum and titanium. The system further comprises an instrument for dispensing a color developing agent for the salt over the image in color reactive contact with the salt. The color developing agent comprises a metal complexing agent for the ions of the salt. The complexing agent is diphenylcarbazone or a ring substituted diphenylcarbazone derivative corresponding to the structural formula

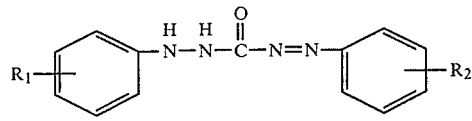

where each of $R_1$ and $R_2$ is lower alkyl, lower alkoxy or hydrogen.

The invention is further directed to a system for use in the printing and developing of a latent image. This system comprises a latent image ink comprising a carboxylic or organic sulfonic acid salt of the metal selected from the group consisting of zinc, mercury, copper, iron, cobalt, aluminum and titanium, a binder for the salt, and a solvent for the salt. The system further comprises an instrument, as defined above, for dispensing the color developing agent for the salt.

Further contemplated by the invention is a crayon adapted for development of a latent image on a substrate by marking thereover, the latent image being as defined above. The crayon comprises wax, a complexing agent for the ions of the metal and a solvent for the complexing agent. The complexing agent is diphenylcarbazone or a ring substituted diphenylcarbazone derivative of the type identified above.

Additionally, the invention includes a method for developing a latent image on a substrate. The image comprises a salt of the aforesaid type and a binder for the salt. A color developing agent, comprising a complexing agent of the type defined above, is dispensed over the image in color reactive contact with the salt.

Further included in the invention is a latent image printing ink adapted for the dry offset printing of images subject to color development with diphenylcarbazone or a ring substituted derivative thereof. The ink comprises between about 3% and about 12% by weight of zinc in the form of a carboxylic acid salt thereof, between about 10% and about 15% by weight of a resinous binder, between about 3% and about 15% by weight of a drying oil and between about 5% and about 40% by weight of a slow drying solvent.

An alternative latent image printing ink comprises between about 2% and about 8% by weight of a carboxylic or organic sulfonic acid salt of zinc, between about 1% and about 5% by weight of a cellulose ether or cellulose esterbinder for the salt, and between about 80% and about 95% by weight of a solvent selected from the group consisting of alcohols and esters.

Other objects and features will be in part apparent and in part specified hereinafter.

BRIEF DESCRIPTION OF THE DRAWING

The single FIGURE of the drawing illustrates the operation of the latent image development system of the invention by marking over a latent image with the crayon of the invention.

DESCRIPTION OF THE PREFERRED EMBODIMENTS

In accordance with the present invention a novel image development system has been discovered in which a latent image containing a metal salt is developed by reactive contact with a color developing agent for the metal ions of the salt. Preferably, a wax crayon serves as the instrument from which the color reactant is dispensed. However, other instruments, such as for example a felt pen containing a solution of the color developing agent, can also be utilized.

In development of the latent image in accordance with the method of the invention, the color reactive agent is dispensed over the latent image from the crayon, pen or other dispensing instrument, in color reactive contact with the salt. As a consequence, a color reaction takes place in which an inner complex salt of the metal is formed:

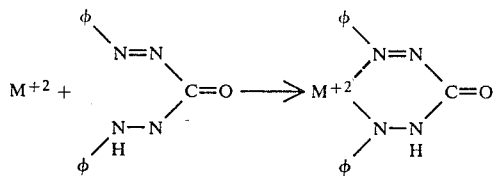

While the metal salt contained in the image is initially colorless, the product of reaction with the complexing agent is a strongly and characteristically colored material which renders the image distinctly visible.

A carboxylic acid or organic sulfonic acid salt constitutes the color forming component of the latent image. Zinc salts are preferred, but salts of mercury, copper, iron, cobalt, aluminum and titanium may also be used. Illustrative of the colorless zinc salts which can be utilized in the latent image include zinc phenol sulfonate, zinc acetate, zinc octoate, zinc neodecanate and zinc resinate. Of these, zinc resinate is most preferred. Comparable salts of the other metals can also be employed.

The latent image is printed by use of an ink containing the metal salt, a binder therefor and a solvent. Various printing methods may be used in applying the ink to a substrate to form the latent image. In one advantageous embodiment of the invention, printing is carried out flexographically and, in this instance, the binder component of the ink is preferably a cellulose derivative, most preferably a cellulose ether or cellulose ester. Exemplary binder materials include ethylhydroxyethyl cellulose, and alcohol soluble cellulose acetate butyrate. A variety of alcohols and esters can be used as the solvent in this type of ink. A mixture of normal propyl alcohol and butyl acetate has been found to be particularly suitable, but a wide variety of common alcohol and ester solvents serve well.

For optimal flexographic printing characteristics and to minimize wicking into a paper substrate, it is preferred that the latent ink composition have a viscosity of between about 15 and 20 seconds, most preferably about 17 seconds, as measured using a #2 Zahn cup. Ethylhydroxyethyl cellulose serves as an especially preferred binder because of its resistance to wicking and because its solutions can be readily prepared in strengths which afford the desired ink solids coverage while exhibiting the desired ink viscosity. Generally, the flexographic printing ink should contain between about 2% and about 8%, preferably 4 to 5%, by weight of the metal salt, between about 1% and about 5%, preferably 2.5 to 4%, by weight of the binder, and between about 80% and about 95% by weight of the solvent. Such ink compositions are adapted for printing on stock paper in a variety of applications of the latent image development system of the invention.

Acetate esters such as propyl acetate and butyl acetate are highly effective solvents for zinc salts such as zinc resinate, but tend to damage certain types of printing plates, for example, plates constituted of duPont's Cyrel polymer. Preferably, therefore, the ink contains between about 15% and about 20% by weight butyl acetate or propyl acetate and 70–75% by weight of an alcohol, most preferably n-propanol. It will be understood, however, that where rubber plates are used, higher proportions of acetate ester can be tolerated and may be advantageous.

For dry offset printing, a relief plate is used for application of a lacquer ink composition containing the metal in the form of its carboxylic acid, a resinous binder, a drying oil and a low volatility slow drying solvent. Where an image containing ink is applied, it has been found that a lacquer ink composition preferably contains between about 3% and about 12% by weight zinc in the form of a carboxylic acid salt thereof, between about 10% and about 15% by weight of the resinous binder, between about 3% and about 15% by weight of the drying oil, and between about 5% and 40% by weight of the solvent.

Whatever printing method is utilized, it is important to control the latent image printing process so as to limit the dry weight of ink solids and thus maintain invisibility of the image. Generally, therefore, the ink volume should be controlled to print at an ink solids dry weight of no more than about 0.15 lb/1000 ft$^2$ of ink coated surface. If ink is applied at higher levels, faint outlines of the image begin to appear. Where the image is applied by flexographic printing techniques, ink solids weight is controlled by use of a transfer roll and doctor blade, the transfer roll having a pattern of depressions therein of known volume per unit area. The doctor blade removes ink in excess of that which fills the depressions. Typically a 200 pyramidal Analox roll, which has a pattern of regularly spaced pyramids on its surface serves suitably for this purpose.

As noted, the dispensing instrument for applying the color reactive complexing agent over the latent image is preferably a wax crayon. In addition to the wax and complexing agent, the crayon contains a solvent for the complexing agent which facilitates its blending with the wax in the production of the crayon. Preferably, the complexing agent is initially dissolved in the solvent and this solution compounded with the wax. To promote compatibility between the complexing agent solution and the wax, and thus to further facilitate manufacture of the crayon, the crayon formulation also preferably includes a coupler, i.e., another solvent whose miscibility with the wax is greater than that of the solvent for the complexing agent, but which is itself quite compatible with the complexing agent solvent. Use of the coupler thus promotes ready preparation of a substantially homogenous blend from which the crayon may be molded.

Optimum performance properties are obtained where the crayon has a melting point of between about 140° F. and about 165° F., a 100 gram penetration of no more than about 30 mm, using the standard penetration test described hereinbelow, and a breaking strength of at least 40 ounces using the weighted beam breaking test also described below.

A variety of waxes can be used in the crayon of the invention. Preferably, the crayon is predominantly constituted of microcrystalline wax, but vegetable waxes, such as candelilla wax (melting point 155° F.–162° F.; 100 g. penetration 1.5–5.0) and carnauba wax (melting point 182°–187° F.; penetration 5.0), and mineral waxes are also useful. A mixture of vegetable and microcrystalline wax is particularly preferred. Carnauba and candellila waxes are effective in absorbing the complexing agent solution and giving a hard nontacky surface to the crayon. Particular microcrystalline waxes that may be used in the preparation of the crayon include the microcrystalline wax sold under the trade designation "B Square 175" by Bareco (melting point 180° F.; 100 g. penetration 19.0), the microcrystalline wax sold under trade designation "180-M" by Witco (melting point 180°–190° F.; penetration 15–20), the microcrystalline wax sold under the trade designation "Mekon White" by Bareco (melting point 199° F.; penetration 5.0), and the mineral wax Cerisin 101 (melting point 154°–164° F.; penetration 10.0) as sold by Ross Wax Co.

As the color reactive complexing agent diphenylcarbazone and di(o-anisyl)carbazone are particularly preferred. Unsubstituted diphenylcarbazone provides a distinctive red color, while di(o-anisyl)carbazone is a blue color former, in reaction with zinc ions. However, other ring substituted diphenylcarbazone derivatives can also be used. Thus, generally the complexing agent corresponds to the structural formula

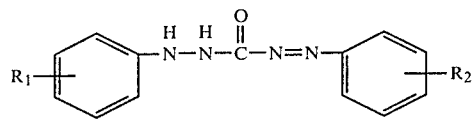

where each of $R_1$ and $R_2$ is independently selected from among lower alkyl, lower alkoxy and hydrogen. Typically useful substituents thus include methyl, ethyl, propyl, butyl, methoxy, ethoxy, propoxy and butoxy.

It has been found that unsubstituted diphenylcarbazone gives an especially sharp image in the development of latent images containing zinc salts. Di(o-anisyl)carbazone has a superior shelf life, as measured by accelerated aging tests in a 130° F. oven, but the unsubstituted complexing agent has better stability to ultraviolet light. Also, diphenylcarbazone is less inclined to deposit color on the background surrounding the image to be developed.

Various dicarboxylic acid esters, monocarboxylic acid esters, hydrogenated lanolin and castor oil derivatives have been found to be useful as the solvent for the complexing agent. The solvent should be sufficiently miscible with the wax not only to allow compounding under agitation but also to avoid development of cloudiness when the stirring is stopped and the formulation allowed to cool in a crayon mold. Castor oil derivatives such as the modified castor oil sold under the trade designation "Lubricin N-1" by National Lead Company and certain dicarboxylic acid esters, notably the esters of sebacic and adipic acid, are particularly preferred. Diesters of phthalic acid, and mono esters of relatively long chain fatty acids, such as lauric and myristic, can also be used. Lubricin N-1 has been found to be the most preferred solvent for di(o-anisyl)carbazone whereas dibenzyl sebacate is the most preferred for diphenylcarbazone. Other exemplary solvents for the complexing agent includes diisopropyl sebacate, dioctyl sebacate, dibutyl sebacate, methyl myristate, methyl laurate, di(isodecyl)phthalate, dibutyl adipate, and methyl ethyl adipate.

Preferably, the crayon comprises about 0.1% and about 0.5% by weight of the complexing agent, between about 20% and about 30% by weight of the solvent for the complexing agent, and between about 70% and about 80% by weight of wax. It is particularly preferred that between about 5% and about 10% by weight of the crayon be comprised of a vegetable wax such as candelilla wax or carnauba wax, and between about 50% and about 75% by weight of the crayon, optimally about 65%, be constituted of a microcrystalline wax such as for example "B Square 175".

As noted, preparation of the crayon is facilitated by the use of a coupler. Solvents useful as couplers are similar in structure to those used as solvents for the complexing agent and, in fact, certain substances are capable of serving in either of these roles. However, in a particular crayon formulation, the coupler generally has a greater relative compatibility with the wax and a lesser solvent effect on the complexing agent as compared to the solvent used as a vehicle for the complexing agent. Exemplary couplers useful in the invention include diisopropyl sebacate, dibutyl sebacate and Emery hydroxyol. Where the crayon contains a coupler, it is preferably comprised of between about 0.1% and about 0.5% by weight of the complexing agent, between about 20% and about 50% by weight of the solvent, between about 50% and about 80% by weight of the wax, and between 0.5% to about 5.0% by weight of the coupler. Dibutyl sebacate at a level of approximately 1.5% by weight is a particularly preferred coupler for enhancing miscibility with microcrystalline waxes.

In the preparation of the crayon of the invention, the complexing agent is initially dissolved in the solvent therefor at a temperature in the range of 200°–240° F., preferably 215°–225° F. Generally, this solution contains between about 0.4% and about 1.5%, preferably 0.6–1% by weight of the complexing agent. The vegetable and/or mineral wax components are then melted into the hot oil solution of the complexing agent, followed by the microcrystalline wax. During wax addition, the temperature of the oil solution is maintained in the aforesaid range and the contents of the mixing vessel agitated to achieve thorough intermixture of the formulation ingredients. Waxes can be added in either solid or premelted form but are preferably premelted. Once a substantially homogeneous mixture is obtained, the composition is cast into crayon molds and allowed to cool, typically for about two days, to form the crayon of the invention. Where a coupler is used, it is preferably included in the oil solution of complexing agent prior to compounding with the wax.

The latent image system of the invention comprises a substrate, preferably stock paper, having an image printed thereon from the latent ink of the invention, and an instrument for dispensing the color developing agent.

This system is advantageously utilized in test materials and self-instructional materials in which correct answers are printed in a latent image that is readily developed to determine whether the student has answered the problems accurately. This system can also be used in a variety of ways in children's amusement books or games. A further very practical application is in the identification of genuine versus counterfeit labels. The system may further be utilized, for example, in sales promotion materials in which an invisible number may be developed for identification of prize winners and the like.

Also contemplated by the invention is a system for use in printing and developing a latent image, comprising the latent image ink and the aforesaid instrument for dispensing the color developing agent.

The single FIGURE of the drawing illustrates the method of the invention in which the color developing agent is dispensed from an instrument such as crayon 1 over a latent image 3 that has been printed on a substrate 5. By marking over image 3 in color reactive contact with the salt contained in the latent image, the inner complex of salt of the complexing agent is formed, thereby producing a visible image as shown at 3'.

The following examples illustrate the invention.

EXAMPLE 1

A number of latent ink compositions were prepared, each containing an organic sulphonic acid or carboxylic acid salt of zinc, a cellulosic binder, and a solvent for the binder. In two of these inks a small proportion of water was included. Compositions of these inks are shown in Table 1.

TABLE 1

| | Ink Composition | | | | | |
|---|---|---|---|---|---|---|
| | Composition - % by weight | | | | | |
| Component | 1 | 2 | 3 | 4 | 5 | 6 |
| Zn phenol sulfonate | 5 | — | — | — | — | — |
| Zn acetate | 1 | — | — | — | — | — |
| Zn resinate | — | 7 | 5.0 | 10.0 | 4.0 | 2.0 |
| Isopropyl alcohol | 91 | 68 | — | — | — | — |
| n-propyl alcohol | — | — | 56.8 | 51.8 | 72.8 | 76.8 |
| n-propyl acetate | — | 20 | — | — | — | — |
| Butyl acetate | — | — | 35.0 | 35.0 | 20.0 | 20.0 |
| Ethyl hydroxyethyl cellulose | — | 3 | 3.0 | 3.0 | 3.0 | 1.0 |
| Cellulose acetate butyrate | 3 | — | — | — | — | — |
| Tinuvin P* | — | — | 0.2 | 0.2 | 0.2 | 0.2 |

*A u.v. absorber sold by Ciba-Geigy which renders the latent image visible under black light.

By use of a conventional flexographic printer having either a synthetic rubber or Cyrel plate thereon, stock paper was printed with latent images utilizing the inks of this example. By means of a 200 pyramidal Analox roll, the weight of the ink was controlled at about 0.07 pounds per 1,000 sq. ft. of paper.

Though all of the images were developable, the latent image produced with composition no. 4 was rather intense and somewhat smeary, while that produced with ink no. 6 was lighter than desired for commercial applications. Composition no. 3 gave the best results when printed with a rubber flexographic printing plate and no. 5 gave the best results with a duPont cyrel polymer plate.

When aged under ordinary conditions or at elevated temperatures of 140° for up to one month, the latent images were stable and showed good color response when treated with diphenylcarbazone or di(o-anisyl)-carbazone using crayons produced as described in Example 2 herein below. When exposed to relative humidities of up to 90%, the images of inks Nos. 2–6 showed good stability.

EXAMPLE 2

Diphenylcarbazone (0.32 parts by weight) was dissolved in a modified castor oil sold under the trade designation Lubricin N-1 at a temperature of 200° F. (39.7 pbw). This oil solution of diphenylcarbazone (DPC) was then compounded with a molten mixture containing the mineral wax Cerisin Wax 101 (50 parts by weight) and Candelilla wax (10 parts by weight). The molten composition was poured into crayon molds for preparation of crayons 7/16" in diameter × 4" long. After the crayons cooled and the mold was removed, the product was observed to have a hard, nontacky surface. These crayons were useful in the dispensing diphenylcarbazone in reactive contact with the zinc salts contained in the images produced in accordance with Example 1.

Additional crayons were produced using either Lubricin N-1 or dibenzyl sebacate as the solvent for the diphenylcarbazone and with various combinations of microcrystalline mineral and vegetable waxes. The compositions of the crayons of this example are set forth in Table 2. It will be noted that in crayon Nos. 4 and 5 dibutyl sebacate was utilized as a coupler to enhance the compatibility between the 180-M microcrystalline wax and the dibenzyl sebacate solvent for the diphenylcarbazone.

TABLE 2

Crayon Compositions

| Component | Composition - % by weight | | | | |
|---|---|---|---|---|---|
| | 1 | 2 | 3 | 4 | 5 |
| 0.8% DPC in Lubricin N-1 | 40 | 25 | — | — | — |
| 0.8% DPC in dibenzyl sebacate | — | — | 25 | 25 | 23.5 |
| Cerisin Wax 101 | 50 | — | 60 | — | — |
| Emery Hydroxyol* | — | — | 5 | — | — |
| Candelilla Wax | 10 | 0 | 10 | — | — |
| Carnauba Wax | — | — | — | 10 | 10 |
| Be Square 175 | — | 55 | — | — | 65 |
| Mekon White Wax | — | 20 | — | — | — |
| 180-M Wax | — | — | — | 63.5 | — |
| Dibutyl sebacate | — | — | — | 1.5 | 1.5 |

*Hydrogenated lanolin sold by Emery Industries, Cincinnati, Ohio

Crayons produced in accordance with formulations of this example were subjected to standard tests for penetration, breaking strength, and melting point. Penetration tests were carried out using a penetrometer produced by Precision Scientific of Chicago, Ill. This instrument comprises a fine needle under a 100 gram of weight which is dropped from a standard height onto the crayon surface, held for five seconds, and released. The penetration is defined as the distance of penetration in millimeters, of which the instrument provides a direct readout. In preparation for testing under the penetrometer, the specimen crayon is maintained at a temperature of 75° F. for at least 24 hours prior to the test.

To determine breaking strength, the crayon is supported at two points along its length, which are 2½ inches apart. A container is hung on a wire from the crayon at a point equidistant between the two points of support and lead shot gradually added to the container until the crayon breaks. The weight of shot in the container at the breaking point is defined as the breaking strength.

Melting point is determined on a standard Fisher-Johns melting point apparatus, in which a flake of wax from the crayon is placed on a heated platform under a watch glass. Temperature of the platform is gradually increased until melting of the piece of wax is visually observed.

Results of the tests of this example are set forth in Table 3.

TABLE 3

| Crayon No. | M.P. | Penetration | Breaking Strength |
|---|---|---|---|
| 1 | ~125° F. | — | 30 oz. |
| 2 | 150 | — | — |
| 3 | 130 | — | — |
| 4 | 155 | — | 39 |
| 5 | 159 | 29 mm | 43 |

Crayons of this example were used in the development of latent images produced in accordance with Example 1. Clear, sharp red images were obtained in each instance.

EXAMPLE 3

In accordance with the method generally described in Example 2, crayons were producing containing di-(o-anisyl)carbazone (DIOAC) as the color reactant complexing agent. Compositions of the crayons of this example are set forth in Table 4.

TABLE 4

Crayon Compositions - DIOAC

| Component | Composition - % by weight | | |
|---|---|---|---|
| | 1 | 2 | 3 |
| 0.8% DIOAC in Lubricin N-1 | 25 | 25 | 25 |
| Cerisin Wax | 60 | — | — |
| Emery Hydroxyol | 15 | — | — |
| Be Square 175 | — | 55 | 65 |
| Carnauba Wax | — | — | 10 |
| Mekon White Wax | — | 20 | — |

Crayons of this example were used in the development of latent images produced in accordance with Example 1. A blue image was obtained in each instance.

EXAMPLE 4

In preparation of latent ink compositions for application of dry offset printing, the following lacquers were prepared:

| Lacquer #1 | |
|---|---|
| Maleic modified rosin resin | 35 parts by weight |
| Chinawood oil alkyd | 35 parts by weight |
| Slow drying aliphatic solvent containing 12% aromatics sold under the trade designation Magie Ink Oil by Magie Brothers | 29 parts by weight |
| Cobalt drier | 1 part by weight |
| Lacquer #2 | |
| Hydrocarbon resin (aromatic polymer) | 40 parts by weight |
| Alkali refined linseed oil | 35 parts by weight |
| Magie Ink Oil | 24 parts by weight |
| Cobalt drier | 1 part by weight |

Each of these lacquers was mixed with a zinc salt and a fluorescent whitener sold under the trade designation Uvitex OB by Ciba-Geigy to produce the dry offset latent image ink composition of this example. The lacquers were mixed with other ink components in the proportions set forth in Table 5, to provide inks having the overall composition set forth in Table 6.

TABLE 5

Latent Ink Compositions

| | Ink No. | | | |
|---|---|---|---|---|
| | 1 | 2 | 3 | 4 |
| Offset Lacquer #1 | 30 | 25 | — | — |
| Offset Lacquer #2 | — | — | 30 | 25 |
| Zinc neodecanate | 68 | — | 68 | — |
| 60% zinc resinate in Magie Ink Oil | — | 73 | — | 73 |
| Uvitex OB fluorescent whitener by Ciba-Geigy | 2 | 2 | 2 | 2 |

TABLE 6

Dry Off-Set Latent Image Printing Inks

| Component | Ink No. | | | |
|---|---|---|---|---|
| | 1 | 2 | 3 | 4 |
| Maleic modified rosin resin | 10.5 | 8.8 | — | — |
| Chinawood oil alkyd | 10.5 | 8.8 | — | — |
| Magie Ink oil | 8.7 | 36.5 | 7.2 | 35.2 |
| Cobalt drier | 0.3 | 0.3 | 0.3 | 0.3 |
| Hydrocarbon resin | — | — | 12 | 10 |
| Alkali refined linseed oil | — | — | 10.5 | 8.8 |
| Zn neodecanate | 68 | — | 68 | — |
| Zn resinate | — | 43.8 | — | 43.8 |
| Uvitex OB | 2 | 2 | 2 | 2 |

To produce a latent image on paper, these inks were printed utilizing a Davidson 500 offset press having a raised image polymer plate. Standard offset printing methods were used but no fountain solution was applied. The ink fountain was set at the lowest level in order to minimize the ink loading on the paper. The image obtained was invisible, but was readily developed to a bright red color using a crayon of the type described in Example 2.

In view of the above, it will be seen that the several objects of the invention are achieved and other advantageous results attained.

As various changes could be made in the above methods and products without departing from the scope of the invention, it is intended that all matter contained in the above description or shown in the accompanying drawing shall be interpreted as illustrative and not in a limiting sense.

What is claimed is:

1. A crayon adapted for development of a latent image on a substrate by marking thereover, said latent image being comprised of a carboxylic or organic sulfonic acid salt of a metal selected from the group consisting of zinc, mercury, copper, iron, cobalt, aluminum and titanium, and a binder for said salt, said crayon comprising wax, a complexing agent for the ions of said metal, and a solvent for the complexing agent, said complexing agent being selected from the group consisting of diphenylcarbazone and ring substituted diphenylcarbazone derivatives corresponding to the structural formula

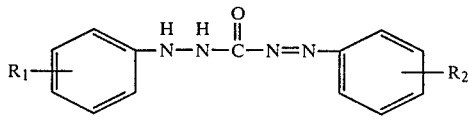

where each of $R_1$ and $R_2$ is selected from the group consisting of alkyl having between 1 and about 4 carbon atoms, alkoxy having between 1 and about 4 carbon atoms, and hydrogen, said solvent being compatible with said wax.

2. A crayon as set forth in claim 1 wherein said complexing agent comprises unsubstituted diphenylcarbazone.

3. A crayon as set forth in claim 1 wherein said complexing agent comprises di-(o-anisyl)carbazone.

4. A crayon as set forth in claim 1 wherein said solvent is selected from the group consisting of dicarboxylic acid diesters, monocarboxylic acid esters and castor oil derivatives.

5. A crayon as set forth in claim 4 wherein said solvent is selected from the group consisting of modified castor oil, diesters of sebacic acid, diesters of phthalic acid, diesters of adipic acid, esters of lauric acid and esters of myristic acid.

6. A crayon as set forth in claim 5 wherein said solvent comprises dibenzyl sebacate.

7. A crayon as set forth in claim 5 wherein said solvent comprises modified castor oil.

8. A crayon as set forth in claim 8 containing a microcrystalline wax.

9. A crayon as set forth in claim 8 wherein said wax further comprises a vegetable wax selected from the group consisting of candelilla wax and carnauba wax.

10. A crayon as set forth in claim 1 comprising between about 0.1% and about 0.5% by weight of said complexing agent, between about 20% and about 30% by weight of said solvent and between about 70% and about 80% by weight of said wax.

11. A crayon as set forth in claim 10 comprising between about 5% and about 10% by weight of a vegetable wax selected from the group consisting of candelilla wax and carnauba wax and between about 50% and about 75% by weight of a microcrystalline wax.

12. A crayon as set forth in claim 1 further comprising a coupler which enhances the compatibility between the solvent and the wax.

13. A crayon as set forth in claim 12 wherein said solvent is selected from the group consisting of dibenzyl sebacate and modified castor oil, and said coupler comprises a lower alkyl sebacate.

14. A crayon as set forth in claim 13 comprising between about 0.1% and about 0.5% by weight of said complexing agent, between about 20% and about 30% by weight of said solvent, between about 70% and about 80% by weight of said wax, and between about 0.5% and about 5.0% by weight of said coupler.

* * * * *